(12) United States Patent
Rohwer et al.

(10) Patent No.: US 6,457,016 B1
(45) Date of Patent: Sep. 24, 2002

(54) TIMESTAMP COMMIT

(75) Inventors: Cary Lane Rohwer, Gilroy; Mark Joseph Sugg, Morgan Hill, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,290

(22) Filed: Jan. 4, 2000

(51) Int. Cl.[7] .............................................. G06F 17/30
(52) U.S. Cl. .................... 707/102; 707/10; 707/103 R; 707/104.1; 707/503
(58) Field of Search ............................ 707/1, 10, 204, 707/501, 503, 506, 520, 508, 101, 102, 104.1, 103 R, 200; 706/47; 709/205, 203; 705/35

(56) References Cited

U.S. PATENT DOCUMENTS

| | | | |
|---|---|---|---|
| 5,504,899 A | | 4/1996 | Raz ............................... 707/10 |
| 5,530,851 A | * | 6/1996 | Fortier ........................... 707/2 |
| 5,694,601 A | * | 12/1997 | White .......................... 709/101 |
| 5,757,669 A | | 5/1998 | Christie et al. ............. 709/205 |
| 5,774,887 A | * | 6/1998 | Wolff et al. .................... 707/1 |
| 5,805,171 A | * | 9/1998 | St. Clair et al. ............ 345/619 |
| 5,842,195 A | * | 11/1998 | Peters et al. ................... 707/1 |
| 5,896,530 A | * | 4/1999 | White .......................... 709/102 |
| 5,903,898 A | | 5/1999 | Cohen et al. ............... 707/204 |
| 5,926,822 A | * | 7/1999 | Garman ....................... 707/500 |
| 6,115,710 A | * | 9/2000 | White .......................... 707/10 |
| 6,115,711 A | * | 9/2000 | White .......................... 707/10 |
| 6,292,827 B1 | * | 9/2001 | Raz ............................. 709/217 |
| 6,314,415 B1 | * | 11/2001 | Mukherjee ................... 706/45 |

OTHER PUBLICATIONS

Salzberg, Betty, "Timestamping After Commit", Proceedings of the Third International Conference on Parallel and Distributed Information Systems, Sep. 28–30, 1994, pp. 160–167.*

Titus, Jon, "Machine–Vision Software:It's Not Just for Experts", Test & Measurement World, Apr. 15, 1999, pp. 1–7.*

* cited by examiner

*Primary Examiner*—Hosain T. Alam
*Assistant Examiner*—Shahid Alam
(74) *Attorney, Agent, or Firm*—Sawyer Law Group LLP

(57) ABSTRACT

A system and method for speeding data entry into an electronic form. the method includes providing the electronic form with a field that requires input of real-time data, and displaying the form to a user. The data is then automatically retrieved and displayed in real-time in the field. In response to a user interaction, the data is committed such that a current value of the data becomes a static entry in the field.

9 Claims, 2 Drawing Sheets

TIMESTAMP COMMIT

FIELD OF THE INVENTION

The present invention relates to graphical user interfaces, and more particularly to a method for increasing data entry speed in a graphical user interface of an electronic document management system.

BACKGROUND OF THE INVENTION

Electronic document management systems (EDMS) are used by many businesses for electronic storage and retrieval of papers and forms. For example, insurance companies are required to maintain client records for up to seven years, resulting in a substantial amount of paper to store. To reduce the amount of paper, companies use the EDMS to attempt to create a "paperless office." Documents are scanned into the system as images, and then manual data entry or optical character recognition software is used to index documents according to index classes.

An index class indicates what information on each document needs to be entered into the system for future retrieval. Users enter the information from each document into the EDMS through a graphical-user-interface (GUI) data entry form. Many index classes defined by an EDMS require a timestamp indicating when a data entry person began processing a document. The GUI form, therefore, typically includes a timestamp text field in which the user manually types-in the current time and/or date in the format. required by the EDMS.

Data entry personnel are typically paid based on how many documents per day the processes. The EDMS GUI, however, is designed for accuracy, not speed of entry. As with most GUI's, the user is required to use a mouse to click on a field and then type in text using the keyboard, click with the mouse again, and so on. Such GUI interaction is a slow and tedious process for data entry, costing the users money. Manually entering the time and date in the timestamp field is an example of one of the time consuming tasks. If the time and date are entered in the wrong format, the system signals an error and the user must correct the mistake, which consumes even more time. What users would like is a method for inputting data that minimizes mouse and keyboard interaction.

One common solution has been to provide the GUI with a timestamp button that inserts the time/date when the user clicks the button using the mouse. However, users still do not favor this method because they are still required to interact with the mouse or press a shortcut key combination on the keyboard.

Another solution has been to add an invisible timestamp field to a form in which the current time/date is automatically entered when the user commits or saves the form. The disadvantages are that the user is not provided with feedback as to what time/date was saved, and implementing this type of field usually requires the customer to program this feature into the EDMS.

Accordingly, what is needed is a method for committing a timestamp in an entry form that minimizes user interaction, yet provides the user with control over what exactly is being entered. The present invention addresses such a need.

SUMMARY OF THE INVENTION

The present invention provides a method and system for speeding data entry into an electronic form. The method and system include providing the electronic form with a field that requires input of real-time data, and displaying the form to a user. The data is then automatically retrieved and displayed in real-time in the field. In response to a user interaction, the data is committed such that a current value of the data becomes a static entry in the field.

According to the system and method disclosed herein, the present invention speeds data entry by minimizing the amount of data the user must enter, and yet provides the user with control over what exactly is being entered.

DETAILED DESCRIPTION

The present invention relates to speeding the input of data into a GUI-based electronic form. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
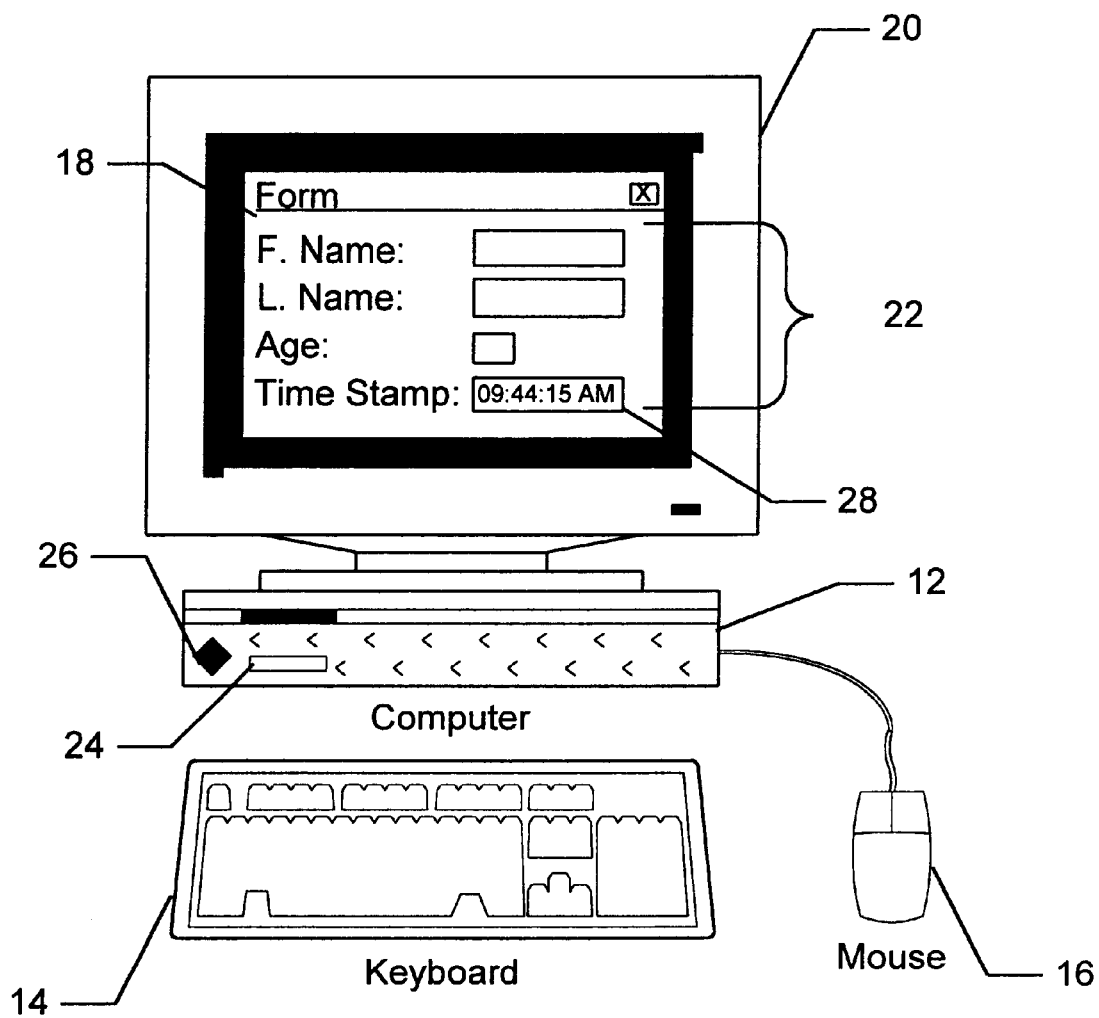
FIG. 1 is a block diagram illustrating an example system environment in the present invention resides.

FIG. 1 is a block diagram illustrating an example system environment in which the present invention resides. The system 10 includes a workstation or personal computer 12, which is controlled by a keyboard 14 and a pointing device, such as a mouse 16. A program, such as an EDMS for example, displays an electronic form 18 on the computer's monitor 20 that lists several database fields 22 for input by a user. The electronic form 18 is preferably implemented as a graphical user interface (GUI) form, although the present invention may be used with non-GUI forms as well. The computer 12 also includes a real-time clock 24, and may include, or be coupled to, other real-time devices 26, such as a sensor, that outputs real-time data.

The present invention provides a method and system for speeding data entry into an electronic form. The present invention speeds data entry by automatically providing real-time data in a designated field of the form 18, rather than requiring the user to manually enter the real-time information. The data will continue to advance in real-time until the user "commits" the data. Committing the data in the designated field stops the data from being updated and become a fixed entry in the field. Thus, the present invention speeds data entry by minimizing the amount of data the user must enter, and yet provides the user with control over what exactly is being entered.

Figure 2:
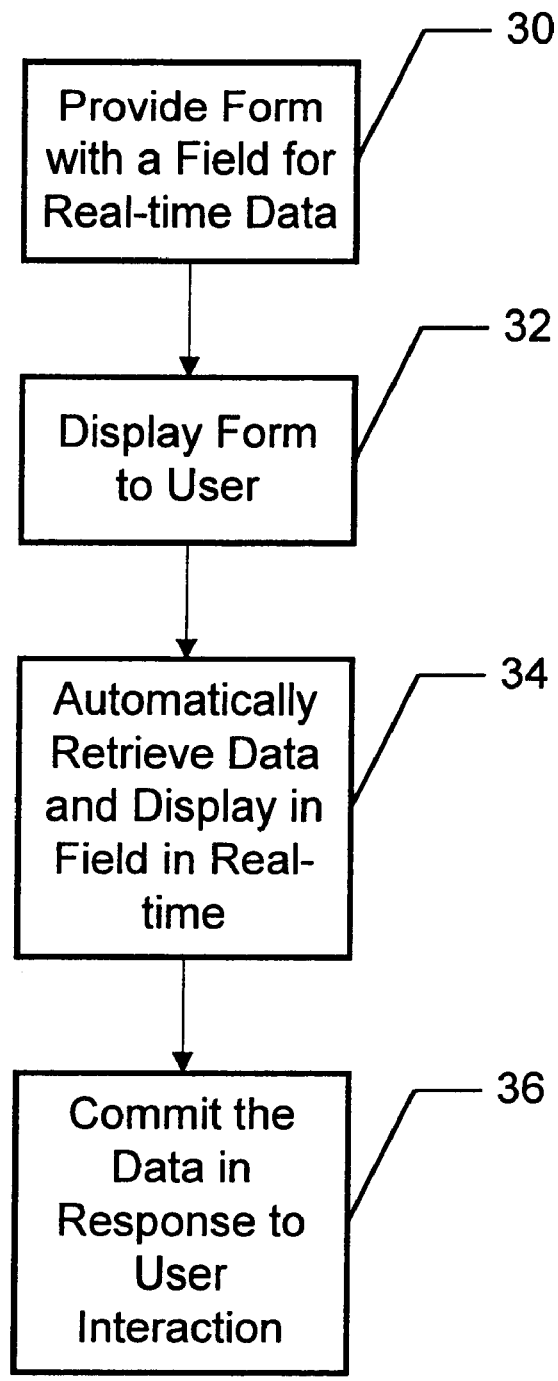
FIG. 2 is a flow chart illustrating a process for speeding data entry into a GUI form in accordance with a preferred embodiment of the present invention.

Referring now to FIG. 2, a flow chart is shown illustrating a process for speeding data entry into an electronic form in accordance with a preferred embodiment of the present invention. The process begins by providing the electronic form 18 with a field 28 that requires the input of real-time data in step 30, and displaying the form 18 to a user in step 32. In a preferred embodiment of the present invention, the electronic form 18 is provided with a timestamp field 28 that requires the input of the current time and/or date (See FIG. 1).

After the form 18 is displayed, data required to be input into the field 28 is automatically retrieved and displayed in the field in real-time in step 34. Referring to FIG. 1, in the case of a timestamp, this is done by performing a software system call that returns the time and/or date from the system clock 24. The real-time format is then converted into a string and displayed in the timestamp field 28. The system call and conversion are repeated in a continuous loop until stopped as explained below. Retrieving data from other real-time devices 26 is a similar process.

Referring again to FIG. 2, in response to a user interaction, the data is committed such that the real-time display of the data is stopped and a current value of the data becomes a static entry in the field 28 in step 36. The user interaction includes activating the field 28 (also known as giving the field focus), and then committing the field. Providing the field 28 with focus is done by either tabbing to the field 28, clicking on the field 28 using the mouse 16, or by pressing the <enter> key on the keyboard 14 from a previous field 22.

In a preferred embodiment, after giving the field 28 focus, the user commits the data by pressing the <enter> key on the keyboard 14, which stops the data from advancing and displays the current data value. In an alternative embodiment, the user may commit the data by providing a "commit button" on the form and allowing the user to click the "commit button" using the mouse 16. It should be understood, however, that the data in the field 28 will continue to advance if the user "tabs" from the field 28 or clicks on another field 22 using the mouse 16.

A method and system for speeding data entry in an electronic form requiring real-time data has been disclosed in which the amount of data the user must enter is minimized, while the user maintains control over what exactly is being entered.

The present invention has been described in accordance with the embodiments shown, and one of ordinary skill in the art will readily recognize that there could be variations to the embodiments, and any variations are would be within the spirit and scope of the present invention. Accordingly, many modifications may be made by one of ordinary skill in the art without departing from the spirit and scope of the appended claims.

What is claimed is:

1. A method for speeding data entry into an electronic document management system form, comprising the steps of:
   (a) providing the electronic document management system form with a field that requires input of a time value;
   (b) displaying the electronic document management system form to a user;
   (c) automatically retrieving a timestamp from a system clock and displaying the timestamp in the field in real-time; and
   (d) in response to a user interaction, committing the timestamp such that a current value of the timestamp becomes a static entry in the field, thereby eliminating a need for a user to enter the timestamp into the field and speeding data entry into the electronic document management system.

2. The method of claim 1 wherein step (d) further includes the step of:
   i) committing the timestamp in response to the user pressing a key on a keyboard.

3. The method of claim 1 wherein step (d) further includes the step of:
   i) committing the timestamp in response to the user clicking a button on the form using a pointing device.

4. A system for speeding data entry into an electronic document management system form, the electronic document management system form having a field that requires input of a time value, the system comprising:
   means for displaying the electronic document management system form to a user;
   means for automatically retrieving a timestamp from a system clock and displaying the timestamp in the field in real-time; and
   means for committing the timestamp in response to a user interaction such that a current value of the timestamp becomes a static entry in the field, thereby eliminating a need for a user to the timestamp into the field and speeding data entry into the electronic document management system.

5. The system of claim 4 wherein the timestamp is committed in response to the user pressing a key on a keyboard.

6. The system of claim 4 wherein the timestamp is committed in response to the user clicking a button on the form using a pointing device.

7. A computer-readable medium containing program instructions for speeding data entry into an electronic form, the program instructions for:
   (a) providing the electronic document management system form with a field that requires input of a time value;
   (b) displaying the electronic document management system form to a user;
   (c) automatically retrieving a timestamp from a system clock and displaying the timestamp in the field in real-time; and
   (d) in response to a user interaction, committing the timestamp such that a current value of the timestamp becomes a static entry in the field, thereby eliminating a need for a user to enter the timestamp into the field and speeding data entry into the electronic document management system.

8. The computer-readable medium of claim 7 wherein program instruction (d) further includes the program instruction of:
   i) committing the timestamp in response to the user pressing a key on a keyboard.

9. The computer-readable medium of claim 7 wherein program instruction (d) further includes the program instruction of:
   ii) committing the timestamp in response to the user clicking a button on the form using a pointing device.

* * * * *

UNITED STATES PATENT AND TRADEMARK OFFICE
CERTIFICATE OF CORRECTION

PATENT NO. : 6,457,016 B1
DATED : September 24, 2002
INVENTOR(S) : Rohwer et al.

It is certified that error appears in the above-identified patent and that said Letters Patent is hereby corrected as shown below:

Column 1,
Line 31, sentence should read as follows:
   Data entry personnel are typically paid based on how many documents per day the person processes.

Column 3,
Line 34, sentence should read as follows:
        The present invention has been described in accordance with the embodiments shown, and one of ordinary skill in the art will readily recognize that there could be variations to the embodiments, and any variations would be within the spirit and scope of the present invention.

Column 4,
Lines 10-24, claim 4 should read:

4.   A system for speeding data entry into an electronic document management system form, the electronic document management system form having a field that requires input of a time value, the system comprising:
      means for displaying the electronic document management system form to a user;
      means for automatically retrieving a timestamp from a system clock and displaying the timestamp in the field in real-time; and
      means for committing the timestamp in response to a user interaction such that a current value of the timestamp becomes a static entry in the field, thereby eliminating a need for a user to enter the timestamp into the field and speeding data entry into the electronic document management system.

Signed and Sealed this

Thirteenth Day of May, 2003

JAMES E. ROGAN
*Director of the United States Patent and Trademark Office*